United States Patent
Wang et al.

(10) Patent No.: US 9,769,904 B2
(45) Date of Patent: Sep. 19, 2017

(54) LIGHT-EMITTING DEVICE

(71) Applicant: LITE-ON TECHNOLOGY CORPORATION, Taipei (TW)

(72) Inventors: Chien-Lung Wang, Taichung (TW); Shih-Chang Wang, New Taipei (TW); Po-Chang Li, Taoyuan (TW); Li-Po Chang, Taoyuan (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 213 days.

(21) Appl. No.: 14/610,353

(22) Filed: Jan. 30, 2015

(65) Prior Publication Data
US 2016/0057820 A1 Feb. 25, 2016

(30) Foreign Application Priority Data
Aug. 22, 2014 (TW) ............................. 103129022 A (51) Int. Cl.
| | |
|---|---|
| G01B 7/14 | (2006.01) |
| H05B 37/02 | (2006.01) |
| H01J 1/00 | (2006.01) |
| H01J 61/00 | (2006.01) |

(52) U.S. Cl.
CPC ............ H05B 37/0218 (2013.01); H01J 1/00 (2013.01); H01J 61/00 (2013.01); H01J 2201/00 (2013.01); Y02B 20/46 (2013.01)

(58) Field of Classification Search
CPC ........... H01J 1/00; H01J 61/00; H01J 2201/00
See application file for complete search history.

(56) References Cited

U.S. PATENT DOCUMENTS

| | | | | |
|---|---|---|---|---|
| 6,191,568 B1* | 2/2001 | Poletti | ................. | H02M 5/2576 |
| | | | | 315/360 |
| 6,417,651 B1* | 7/2002 | Kronberg | .................. | G05F 1/14 |
| | | | | 323/255 |
| 2001/0024373 A1* | 9/2001 | Cuk | ........................ | H02M 1/44 |
| | | | | 363/16 |
| 2009/0261748 A1* | 10/2009 | McKinney | ......... | H05B 33/0812 |
| | | | | 315/254 |

(Continued)

*Primary Examiner* — Huy Q Phan
*Assistant Examiner* — Temilade Rhodes-Vivour
(74) *Attorney, Agent, or Firm* — Li&Cai Intellectual Property (USA) Office (57) ABSTRACT

A light-emitting device includes an autotransformer, a circuit module and a light-emitting module. The autotransformer includes a first positive conductive wire for receiving a first input voltage within a first predetermined voltage range, a second positive conductive wire for receiving a second input voltage within a second predetermined voltage range, and a common negative conductive wire electrically mated to the first positive conductive wire and the second positive conductive wire. The first predetermined voltage range is larger than the second predetermined voltage range. The circuit module includes a driver electrically connected to the autotransformer, and a predetermined operating voltage value for driving the driver is substantially within the second predetermined voltage range. The light-emitting module is electrically connected to the driver. Therefore, one of both the first and the second positive conductive wires along with the common negative conductive wire are electrically connected to an AC power source.

17 Claims, 4 Drawing Sheets

(56) References Cited

U.S. PATENT DOCUMENTS

| | | | |
|---|---|---|---|
| 2010/0039090 A1* | 2/2010 | Sykes | H02M 5/12 323/301 |
| 2012/0293072 A1* | 11/2012 | Chang | H05B 33/0809 315/121 |
| 2012/0299507 A1* | 11/2012 | Chen | H05B 33/0887 315/291 |
| 2013/0221867 A1* | 8/2013 | Deppe | H05B 33/0809 315/224 |

* cited by examiner

LIGHT-EMITTING DEVICE

BACKGROUND OF THE INVENTION

1. Field of the Invention

The instant disclosure relates to a light-emitting device, and more particularly to a light-emitting device selectively and electrically connecting to a high-voltage AC (alternating current) power source or a low-voltage AC power source.

2. Description of Related Art

When a supply voltage value provided by an AC power source is within two different voltage ranges such as a high-voltage range and a low-voltage range at the same region, it is inconvenient for a consumer to procure and assemble two different LED lamps with two different voltage ranges of the AC power source. Although the LED lamp can use two different LED drivers for two different voltage ranges of the same AC power source, the cost of the LED lamp with the two different LED drivers is increased.

SUMMARY OF THE INVENTION

One aspect of the instant disclosure relates to a light-emitting device for selectively and electrically connecting to a high-voltage AC power source or a low-voltage AC power source. The light-emitting device can selectively use one of two positive conductive wires to electrically connect with a high-voltage AC power source (such as a voltage within a range substantially between 347 V and 480 V) or use the other positive conductive wire to electrically connect with a low-voltage AC power source (such as a voltage within a range substantially between 100 V and 277 V), according to different supply voltage values provided by an AC power source such as the high-voltage AC power source or the low-voltage AC power source.

One of the embodiments of the instant disclosure provides a light-emitting device, comprising: an autotransformer, a circuit module and a light-emitting module. The autotransformer includes a protection casing and a coil winding received in the protection casing, wherein the coil winding has a first positive terminal for receiving a first input voltage within a first predetermined voltage range, a second positive terminal for receiving a second input voltage within a second predetermined voltage range, and a common negative terminal concurrently and electrically mated to the first positive terminal and the second positive terminal. The first predetermined voltage range is larger than the second predetermined voltage range. The circuit module includes a driver electrically connected to the autotransformer, and a predetermined operating voltage value for driving the driver is substantially within the second predetermined voltage range. The light-emitting module is electrically connected to the driver. One of both the first positive terminal and the second positive terminal along with the common negative terminal are electrically connected to an alternating current power source.

More precisely, when a predetermined supply voltage value provided by the alternating current power source is within the first predetermined voltage range, the first positive terminal and the common negative terminal both are electrically connected to the alternating current power source, such that the predetermined supply voltage value provided by the alternating current power source is reduced to a step-down voltage value within the second predetermined voltage range through the coil winding, and then the step-down voltage value is transmitted to the driver for driving the light-emitting module.

More precisely, when a predetermined supply voltage value provided by the alternating current power source is within the second predetermined voltage range, the second positive terminal and the common negative terminal both are electrically connected to the alternating current power source, such that the predetermined supply voltage value provided by the alternating current power source is directly transmitted to the driver for driving the light-emitting module.

Another one of the embodiments of the instant disclosure provides a light-emitting device, comprising: an autotransformer, a circuit module and a light-emitting module. The autotransformer includes a first positive conductive wire for receiving a first input voltage within a first predetermined voltage range, a second positive conductive wire for receiving a second input voltage within a second predetermined voltage range, and a common negative conductive wire concurrently and electrically mated to the first positive conductive wire and the second positive conductive wire. One of both the first positive conductive wire and the second positive conductive wire along with the common negative conductive wire are electrically connected to an alternating current power source, and the first predetermined voltage range is larger than the second predetermined voltage range. The circuit module includes a driver electrically connected to the autotransformer, and a predetermined operating voltage value for driving the driver is substantially within the second predetermined voltage range. The light-emitting module is electrically connected to the driver. Hence, when a predetermined supply voltage value provided by the alternating current power source is within the first predetermined voltage range, the first positive conductive wire and the common negative conductive wire both are electrically connected to the alternating current power source, such that the predetermined supply voltage value provided by the alternating current power source is reduced to a step-down voltage value within the second predetermined voltage range through the coil winding, and then the step-down voltage value is transmitted to the driver for driving the light-emitting module.

Yet another one of the embodiments of the instant disclosure provides a light-emitting device, comprising: an autotransformer, a circuit module and a light-emitting module. The autotransformer includes a first positive conductive wire for receiving a first input voltage within a first predetermined voltage range, a second positive conductive wire for receiving a second input voltage within a second predetermined voltage range, and a common negative conductive wire concurrently and electrically mated to the first positive conductive wire and the second positive conductive wire. One of both the first positive conductive wire and the second positive conductive wire along with the common negative conductive wire are electrically connected to an alternating current power source, and the first predetermined voltage range is larger than the second predetermined voltage range. The circuit module includes a driver electrically connected to the autotransformer, and a predetermined operating voltage value for driving the driver is substantially within the second predetermined voltage range. The light-emitting module is electrically connected to the driver. Hence, when a predetermined supply voltage value provided by the alternating current power source is within the second predetermined voltage range, the second positive conductive wire and the common negative conductive wire both are electrically connected to the alternating current power source, such that the predetermined supply voltage value provided by the alternating current power source is directly transmitted to the driver for driving the light-emitting module.

More precisely, the protection casing is composed of a base plate, two first lateral plates corresponding to each other, two second lateral plates corresponding to each other, and a cover plate, wherein the base plate, the two first lateral plates, the two second lateral plates, and the cover plate are mated to each other to form an enclosed space for receiving the coil winding. The two first lateral plates are respectively extended upward from two opposite lateral sides of the base plate, each first lateral plate has two first bending portions correspondingly bent inward and two second bending portions correspondingly bent inward from two ends of the two first bending portions, each second lateral plate is disposed on the base plate and positioned between the two first bending portions of the two first lateral plates, the cover plate has two third bending portions bent downward to respectively contact the two first lateral plates and two fourth bending portions bent downward to respectively contact the two second lateral plates, and the two second bending portions of each first lateral plate pass through a notch between the third bending portion and the fourth bending portion and are retained on a top surface of the cover plate. The base plate is a single substrate having at least four positioning holes, and at least four securing elements respectively pass through the at least four positioning holes to position the base plate on a heat-dissipating base.

Therefore, the light-emitting device can selectively use one of the first positive conducive wire and the second positive conductive wire to electrically connect with the AC power source according to the predetermined supply voltage value provided by the AC power source, provided that the predetermined supply voltage value is within the first predetermined voltage range or the second predetermined voltage range due to the design of the autotransformer and the drive, in which "the autotransformer includes a first positive conductive wire for receiving a first input voltage within a first predetermined voltage range, a second positive conductive wire for receiving a second input voltage within a second predetermined voltage range small than the first predetermined voltage range, and a common negative conductive wire concurrently electrically mated to the first positive conductive wire and the second positive conductive wire" and "the driver is electrically connected to the autotransformer, and a predetermined operating voltage value for driving the driver is substantially within the second predetermined voltage range". Hence, the same light-emitting device can be applied to selectively and electrically connect to a high-voltage AC power source or a low-voltage AC power source according to the predetermined supply voltage value provided by the AC power source, provided that the predetermined supply voltage is within a high-voltage range or a low-voltage range.

To further understand the techniques, means and effects of the instant disclosure applied for achieving the prescribed objectives, the following detailed descriptions and appended drawings are hereby referred to, such that, and through which, the purposes, features and aspects of the instant disclosure can be thoroughly and concretely appreciated. However, the appended drawings are provided solely for reference and illustration, without any intention to limit the instant disclosure.

DETAILED DESCRIPTION OF THE PREFERRED EMBODIMENTS

The embodiments of "a light-emitting device" of the instant disclosure are described. Other advantages and objectives of the instant disclosure can be easily understood by one skilled in the art from the disclosure. The instant disclosure can be applied in different embodiments. Various modifications and variations can be made to various details in the description for different applications without departing from the scope of the instant disclosure. The drawings of the instant disclosure are provided only for simple illustrations, but are not drawn to scale and do not reflect the actual relative dimensions. The following embodiments are provided to describe in detail the concept of the instant disclosure, and are not intended to limit the scope thereof in any way.

Figure 1:
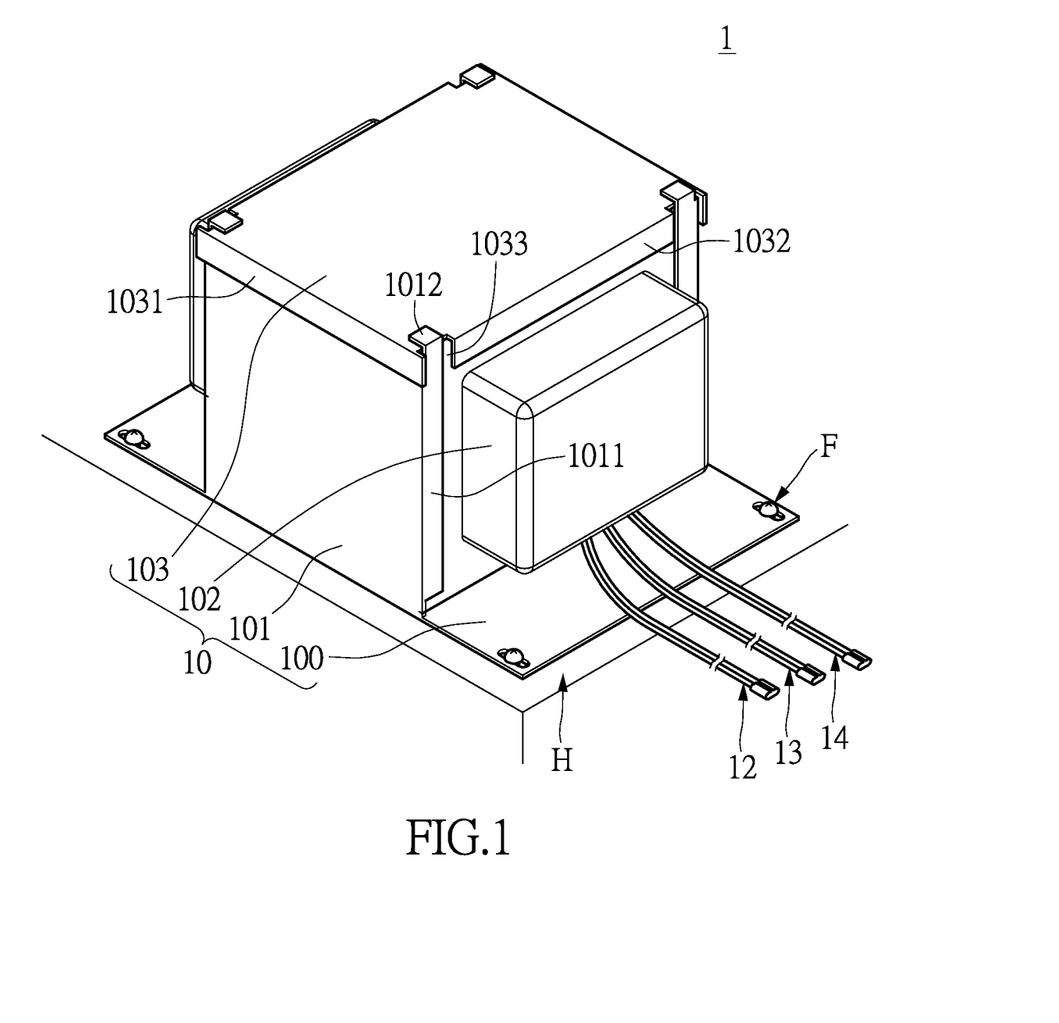
FIG. 1 shows a perspective assembled schematic view of the light-emitting device according to the instant disclosure.
Figure 2:
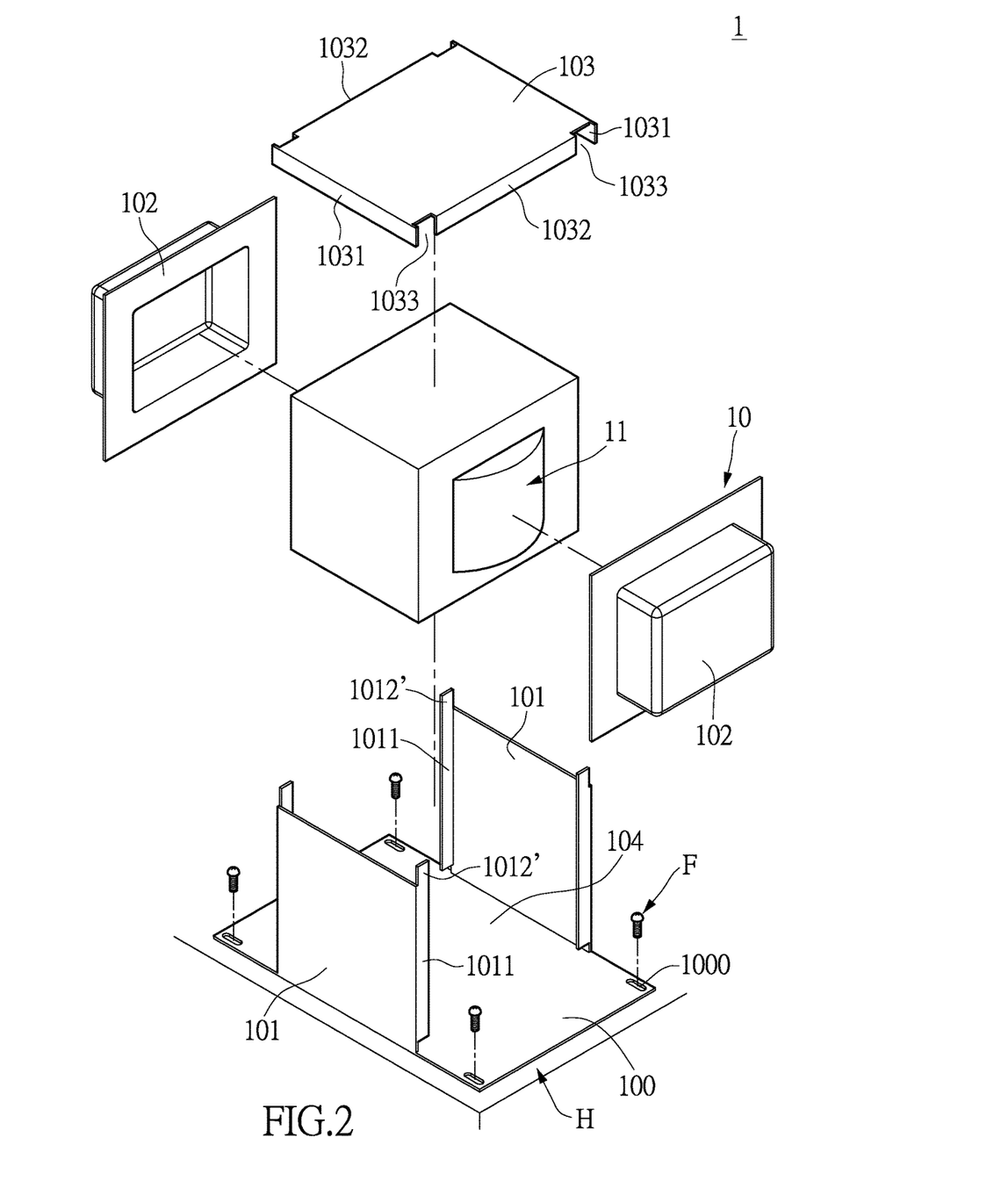
FIG. 2 shows a perspective exploded schematic view of the light-emitting device according to the instant disclosure.
Figure 3:
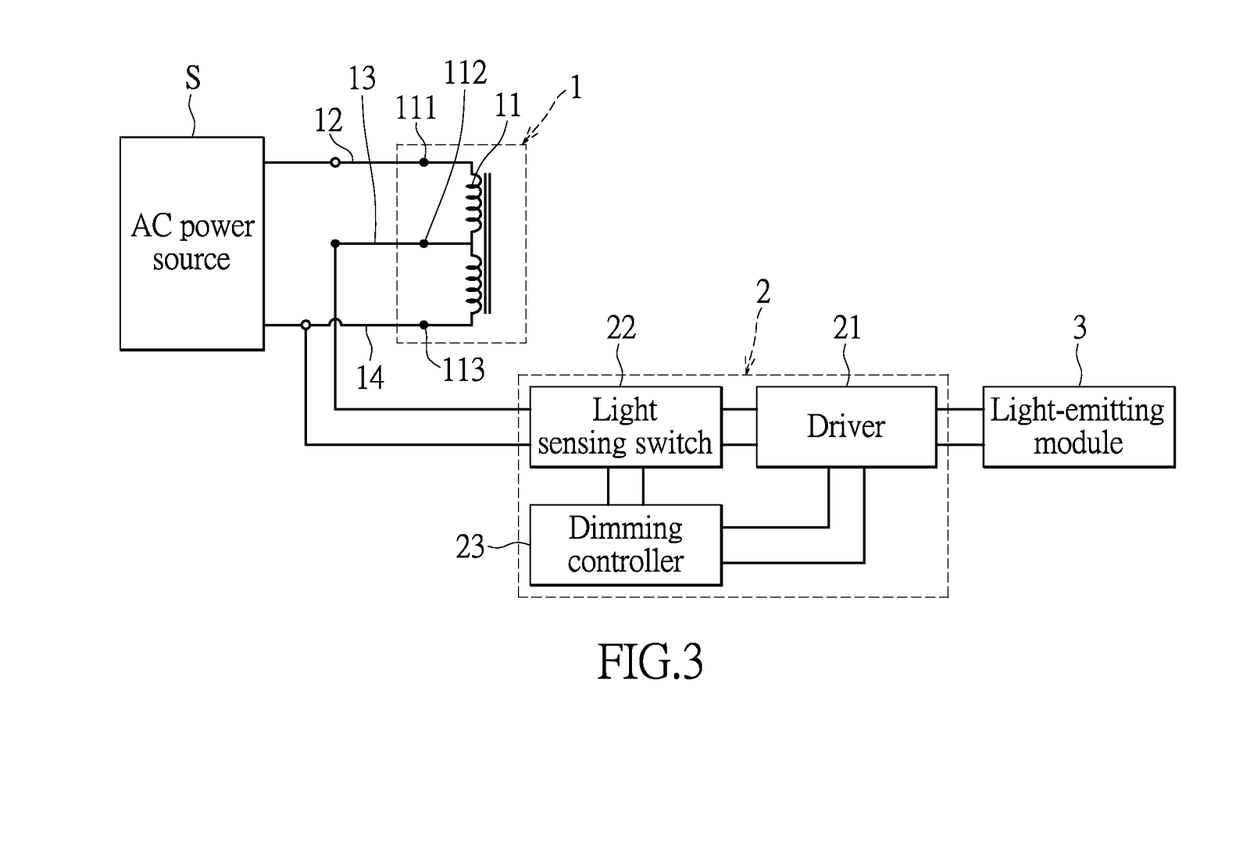
FIG. 3 shows a functional block diagram demonstrating that the high-voltage AC power source within a range substantially between 347 V and 480 V is transmitted to the circuit module through the coil winding, according to the instant disclosure.
Figure 4:
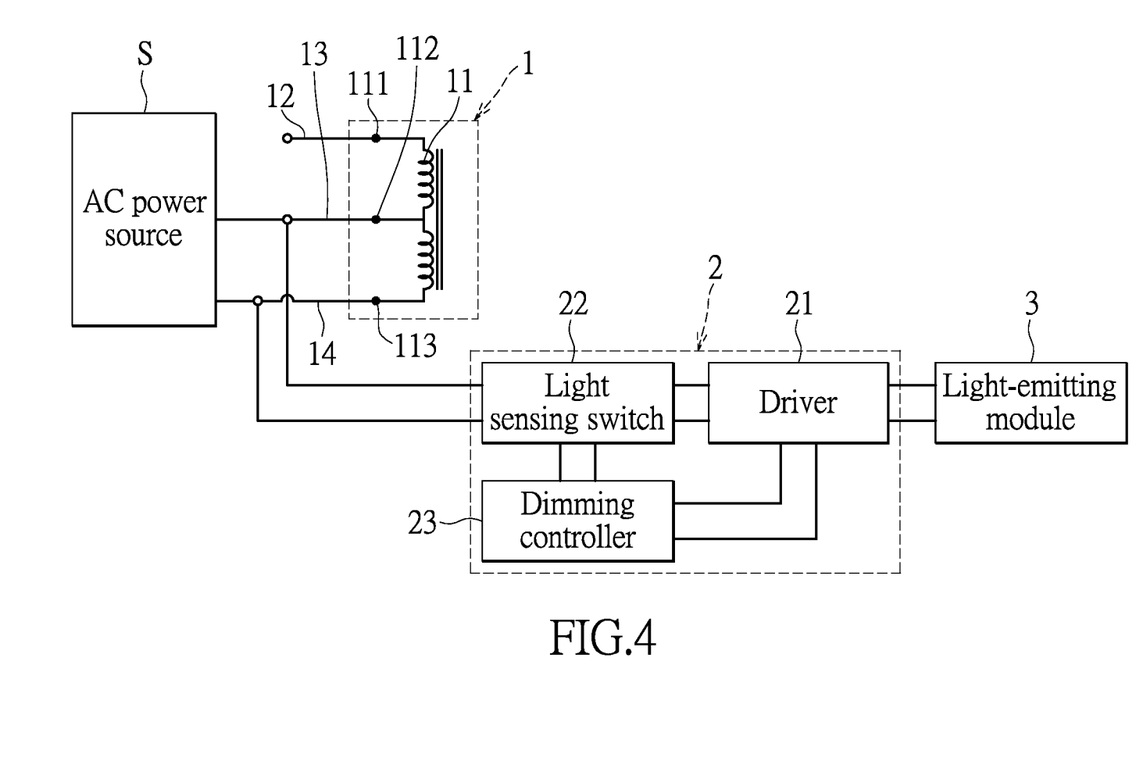
FIG. 4 shows a functional block diagram demonstrating that the low-voltage AC power source within a range substantially between 100 V and 277 V is directly transmitted to the circuit module without passing the coil winding, according to the instant disclosure.

Referring to FIG. 1 to FIG. 4, FIG. 1 is a perspective assembled schematic diagram, FIG. 2 is a perspective exploded schematic diagram, FIG. 3 is a functional block diagram demonstrating that the high-voltage AC power source within a range substantially between 347 V and 480 V is transmitted to the circuit module through the coil winding, and FIG. 4 is a functional block diagram demonstrating that the low-voltage AC power source within a range substantially between 100 V and 277 V is directly transmitted to the circuit module without passing the coil winding. The instant disclosure provides a light-emitting device directly and electrically connected to an AC power source S, comprising: an autotransformer 1, a circuit module 2 and a light-emitting module 3.

First, referring to FIG. 1 and FIG. 2, the autotransformer 1 includes a protection casing 10 and a coil winding 11 received in the protection casing 10. The autotransformer 1 further includes a first positive conductive wire 12 for receiving a first input voltage within a first predetermined voltage range, a second positive conductive wire 13 for receiving a second input voltage within a second predetermined voltage range, and a common negative conductive wire 14 concurrently and electrically mated to the first positive conductive wire 12 and the second positive conductive wire 13, and the first predetermined voltage range is larger than the second predetermined voltage range. For example, the first predetermined voltage range may be substantially between 347 V and 480 V, and the second predetermined voltage range may be substantially between 100 V and 277 V, but that is merely an example and is not meant to limit the instant disclosure.

Moreover, referring to FIG. 3 or FIG. 4, the circuit module 2 includes a driver 21 (such as an LED driver) electrically connected to the autotransformer 1, and the light-emitting module 3 is electrically connected to the driver 21. More precisely, the circuit module 2 is electrically connected to the second positive conductive wire 13 and the common negative conductive wire 14, and a predetermined operating voltage value for driving the driver 21 may be substantially within the second predetermined voltage range (such as a voltage within a range substantially between 347 V and 480 V). It is worth mentioning that referring to FIG. 3 or FIG. 4, when the light-emitting device needs to be applied to a street lamp, the circuit module 2 further includes a light sensing switch 22 electrically connected between the autotransformer 1 and the driver 21 and a dimming controller 23 electrically connected between the light sensing switch 22 and the driver 21.

More precisely, referring to FIG. 1 and FIG. 2, the protection casing 10 can include a base plate 100, two first lateral plates 101 corresponding to each other, two second lateral plates 102 corresponding to each other, and a cover plate 103. The base plate 100, the two first lateral plates 101, the two second lateral plates 102, and the cover plate 103 are mated to each other to form an enclosed space 104 (or a receiving space) for receiving the coil winding 11. Hence, the protection casing 10 not only can be used to prevent the coil winding 11 from being scratched or damaged, but also can prevent dust from entering the interior of the protection casing 10.

More precisely, referring to FIG. 1 and FIG. 2, the base plate 100 is a single substrate (such as an integrated substrate) having at least four positioning holes 1000, and at least four securing elements F (such as screws) respectively pass through the at least four positioning holes 1000 to position the base plate 100 on a heat-dissipating base H. Therefore, because the at least four positioning holes 1000 are formed on the same piece of the single base plate 100, the shock-resistant effect of the protection casing 10 is increased. In addition, because the base plate 100 is totally flattened against the heat-dissipating base H for increasing the contacting area between the base plate 100 and the heat-dissipating base H, the heat-dissipating effect of the protection casing 10 is increased.

More precisely, referring to FIG. 1 and FIG. 2, the two first lateral plates 101 are respectively extended upward from two opposite lateral sides of the base plate 100, and each first lateral plate 101 has two first bending portions 1011 correspondingly bent inward and two second bending portions 1012 correspondingly bent inward from two ends of the two first bending portions 1011. In addition, each second lateral plate 102 is disposed on the base plate 100 and positioned between the two first bending portions 1011 of the two first lateral plates 101, and the cover plate 103 has two third bending portions 1031 bent downward to respectively contact the two first lateral plates 101 and two fourth bending portions 1032 bent downward to respectively contact the two second lateral plates 102. It is worth noting that the second bending portion 1012' is extended upward from the first lateral plate 101 before bending the second bending portion 1012' as shown in FIG. 2, and then as shown in FIG. 1, the two second bending portions 1012 of each first lateral plate 101 pass through a notch 1033 formed between the third bending portion 1031 and the fourth bending portion 1032 and are retained on a top surface of the cover plate 103. Therefore, because the two first lateral plates 101 are integrally disposed on the two opposite lateral sides of the base plate 100 to form a one-piece element in advance, the protection casing 10 can be assembled by only four components including the one-piece element, the two second lateral plates 102 and the cover plate 103, thus the assembly convenience and the assembly efficiency of the protection casing 10 are increased.

More precisely, referring to FIG. 3 or FIG. 4, the coil winding 11 has a first positive terminal 111 electrically connected to the first positive conductive wire 12, a second positive terminal 112 electrically connected to the second positive conductive wire 13, and a common negative terminal 113 concurrently and electrically mated to the first positive terminal 111 and the second positive terminal 112 and electrically connected to the common negative conductive wire 14. In addition, the coil winding 11 can be divided into a primary winding disposed between the first positive terminal 111 and the common negative terminal 113 and a secondary winding disposed between the second positive terminal 112 and the common negative terminal 113.

Hence, referring to FIG. 1, FIG. 3 and FIG. 4, one of both the first positive conductive wire 12 and the second positive conductive wire 13 along with the common negative conductive wire 14 can be directly and electrically connected to the AC power source S (that is to say, one of both the first positive terminal 111 and the second positive terminal 112 along with the common negative terminal 113 can be directly and electrically connected to the AC power source S), according to different supply voltage values provided by the AC power source S.

For example, referring to FIG. 1 and FIG. 3, when a predetermined supply voltage value provided by the AC power source S is within the first predetermined voltage range (such as a voltage within a range substantially between 347 V and 480 V), the first positive conductive wire 12 and the common negative conductive wire 14 both are directly and electrically connected to the AC power source S (that is to say, the first positive terminal 111 and the common negative terminal 113 both are electrically connected to the AC power source S), such that the predetermined supply voltage value provided by the AC power source S is reduced to a step-down voltage value within the second predetermined voltage range (such as a voltage within a range substantially between 100V and 277 V) through the coil winding 11, and then the step-down voltage value is transmitted to the driver 21 of the circuit module 2 for driving the light-emitting module 3 to generate an illumination light source.

For example, referring to FIG. 1 and FIG. 4, when a predetermined supply voltage value provided by the AC power source S is within the second predetermined voltage range (such as a voltage within a range substantially between 100V and 277 V), the second positive conductive wire 13 and the common negative conductive wire 14 both are directly and electrically connected to the AC power source S (that is to say, the second positive terminal 112 and the common negative terminal 113 both are directly and electrically connected to the AC power source S), such that the predetermined supply voltage value provided by the AC power source S is directly transmitted to the driver 21 of the circuit module 2 for driving the light-emitting module 3 to generate an illumination light source.

It is worth mentioning that when the predetermined supply voltage value provided by the AC power source S is within two different voltage ranges (such as a high-voltage range and a low-voltage range) at the same region, the light-emitting device can selectively use one of the first positive conducive wire 12 and the second positive conductive wire 13 to electrically connect to a high-voltage AC power source within the first predetermined voltage range or a low-voltage AC power source within the second predetermined voltage range. Hence, the same light-emitting device can alternatively "use the first positive conducive wire 12 to electrically connect to the high-voltage AC power source such as within a high-voltage range substantially between 347 V and 480 V" or "use the second positive conductive wire 13 to electrically connect to the low-voltage AC power source such as within a low-voltage range substantially between 100 V and 277 V" at the same region, provided that the predetermined supply voltage value supplied by the AC power source S is within the high-voltage range or the low-voltage range.

In summary, the light-emitting device can selectively use one of the first positive conducive wire 12 and the second positive conductive wire 13 to electrically connect with the AC power source S, provided that the predetermined supply voltage value supplied by the AC power source S is within the first predetermined voltage range or the second predetermined voltage range due to the design of the autotransformer and the driver, in which "the autotransformer 1 includes a first positive conductive wire 12 for receiving a first input voltage within a first predetermined voltage range, a second positive conductive wire 13 for receiving a second input voltage within a second predetermined voltage range small than the first predetermined voltage range, and a common negative conductive wire 14 concurrently electrically mated to the first positive conductive wire 12 and the second positive conductive wire 13" and "the driver 21 is electrically connected to the autotransformer 1, and a predetermined operating voltage value for driving the driver 21 is substantially within the second predetermined voltage range". Hence, the same light-emitting device can be applied to selectively and electrically connect to a high-voltage AC power source or a low-voltage AC power source, provided that the predetermined supply voltage value supplied by the AC power source S is within a high-voltage range or a low-voltage range.

The aforementioned descriptions merely represent the preferred embodiments of the instant disclosure, without any intention to limit the scope of the instant disclosure which is fully described only within the following claims. Various equivalent changes, alterations or modifications based on the claims of the instant disclosure are all, consequently, viewed as being embraced by the scope of the instant disclosure.

What is claimed is:

1. A light-emitting device, comprising:
   an autotransformer including a protection casing and a coil winding received in the protection casing, wherein the coil winding has a first positive terminal for receiving a first input voltage within a first predetermined voltage range, a second positive terminal for receiving a second input voltage within a second predetermined voltage range, and a common negative terminal concurrently and electrically mated to the first positive terminal and the second positive terminal, wherein the first predetermined voltage range is larger than the second predetermined voltage range;
   a circuit module including a driver electrically connected to the autotransformer, wherein a predetermined operating voltage value for driving the driver is substantially within the second predetermined voltage range; and
   a light-emitting module electrically connected to the driver;
   wherein, one of both the first positive terminal and the second positive terminal along with the common negative terminal are electrically connected to an alternating current power source
   wherein the protection casing is composed of a base plate, two first lateral plates corresponding to each other, two second lateral plates corresponding to each other, and a cover plate, wherein the base plate, the two first lateral plates, the two second lateral plates, and the cover plate are mated to each other to form an enclosed space for receiving the coil winding.

2. The light-emitting device of claim 1, wherein when a predetermined supply voltage value provided by the alternating current power source is within the first predetermined voltage range, the first positive terminal and the common negative terminal both are electrically connected to the alternating current power source, such that the predetermined supply voltage value provided by the alternating current power source is reduced to a step-down voltage value within the second predetermined voltage range through the coil winding, and then the step-down voltage value is transmitted to the driver for driving the light-emitting module.

3. The light-emitting device of claim 1, wherein when a predetermined supply voltage value provided by the alternating current power source is within the second predetermined voltage range, the second positive terminal and the common negative terminal both are electrically connected to the alternating current power source, such that the predetermined supply voltage value provided by the alternating current power source is directly transmitted to the driver for driving the light-emitting module.

4. The light-emitting device of claim 1, wherein the coil winding is divided into a primary winding disposed between the first positive terminal and the common negative terminal and a secondary winding disposed between the second positive terminal and the common negative terminal, wherein the autotransformer includes a first positive conductive wire electrically connected to the first positive terminal, a second positive conductive wire electrically connected to the second positive terminal, and a common negative conductive wire is electrically connected to the common negative terminal, wherein the circuit module is electrically connected to the second positive conductive wire and the common negative conductive wire.

5. The light-emitting device of claim 1, wherein the two first lateral plates are respectively extended upward from two opposite lateral sides of the base plate, each first lateral plate has two first bending portions correspondingly bent inward and two second bending portions correspondingly bent inward from two ends of the two first bending portions, each second lateral plate is disposed on the base plate and positioned between the two first bending portions of the two first lateral plates, the cover plate has two third bending portions bent downward to respectively contact the two first lateral plates and two fourth bending portions bent downward to respectively contact the two second lateral plates, and the two second bending portions of each first lateral plate pass through a notch between the third bending portion and the fourth bending portion and are retained on a top surface of the cover plate.

6. The light-emitting device of claim 1, wherein the base plate is a single substrate having at least four positioning holes, and at least four securing elements respectively pass through the at least four positioning holes to position the base plate on a heat-dissipating base.

7. The light-emitting device of claim 1, wherein the circuit module includes a light sensing switch electrically connected between the autotransformer and the driver and a dimming controller electrically connected between the light sensing switch and the driver.

8. A light-emitting device, comprising:
   an autotransformer including a first positive conductive wire for receiving a first input voltage within a first predetermined voltage range, a second positive conductive wire for receiving a second input voltage within a second predetermined voltage range, and a common negative conductive wire concurrently and electrically mated to the first positive conductive wire and the second positive conductive wire, wherein one of both the first positive conductive wire and the second positive conductive wire along with the common negative conductive wire are electrically connected to an alternating current power source, and the first predetermined voltage range is larger than the second predetermined voltage range;

a circuit module including a driver electrically connected to the autotransformer, wherein a predetermined operating voltage value for driving the driver is substantially within the second predetermined voltage range; and a light-emitting module electrically connected to the driver;

wherein, when a predetermined supply voltage value provided by the alternating current power source is within the first predetermined voltage range, the first positive conductive wire and the common negative conductive wire both are electrically connected to the alternating current power source, such that the predetermined supply voltage value provided by the alternating current power source is reduced to a step-down voltage value within the second predetermined voltage range through the coil winding, and then the step-down voltage value is transmitted to the driver for driving the light-emitting module wherein the autotransformer includes a protection casing and a coil winding received in the protection casing, and the coil winding has a first positive terminal electrically connected to the first positive conductive wire, a second positive terminal electrically connected to the second positive conductive wire, and a common negative terminal concurrently and electrically mated to the first positive terminal and the second positive terminal and electrically connected to the common negative conductive wire, wherein the coil winding is divided into a primary winding disposed between the first positive terminal and the common negative terminal and a secondary winding disposed between the second positive terminal and the common negative terminal, and the circuit module is electrically connected to the second positive conductive wire and the common negative conductive wire.

9. The light-emitting device of claim 8, wherein the protection casing is composed of a base plate, two first lateral plates corresponding to each other, two second lateral plates corresponding to each other, and a cover plate, wherein the base plate, the two first lateral plates, the two second lateral plates, and the cover plate are mated to each other to form an enclosed space for receiving the coil winding.

10. The light-emitting device of claim 9, wherein the two first lateral plates are respectively extended upward from two opposite lateral sides of the base plate, each first lateral plate has two first bending portions correspondingly bent inward and two second bending portions correspondingly bent inward from two ends of the two first bending portions, each second lateral plate is disposed on the base plate and positioned between the two first bending portions of the two first lateral plates, the cover plate has two third bending portions bent downward to respectively contact the two first lateral plates and two fourth bending portions bent downward to respectively contact the two second lateral plates, and the two second bending portions of each first lateral plate pass through a notch between the third bending portion and the fourth bending portion and are retained on a top surface of the cover plate.

11. The light-emitting device of claim 9, wherein the base plate is a single substrate having at least four positioning holes, and at least four securing elements respectively pass through the at least four positioning holes to position the base plate on a heat-dissipating base.

12. The light-emitting device of claim 8, wherein the circuit module includes a light sensing switch electrically connected between the autotransformer and the driver and a dimming controller electrically connected between the light sensing switch and the driver.

13. A light-emitting device, comprising:

an autotransformer including a first positive conductive wire for receiving a first input voltage within a first predetermined voltage range, a second positive conductive wire for receiving a second input voltage within a second predetermined voltage range, and a common negative conductive wire concurrently and electrically mated to the first positive conductive wire and the second positive conductive wire, wherein one of both the first positive conductive wire and the second positive conductive wire along with the common negative conductive wire are electrically connected to an alternating current power source, and the first predetermined voltage range is larger than the second predetermined voltage range;

a circuit module including a driver electrically connected to the autotransformer, wherein a predetermined operating voltage value for driving the driver is substantially within the second predetermined voltage range; and a light-emitting module electrically connected to the driver;

wherein, when a predetermined supply voltage value provided by the alternating current power source is within the second predetermined voltage range, the second positive conductive wire and the common negative conductive wire both are electrically connected to the alternating current power source, such that the predetermined supply voltage value provided by the alternating current power source is directly transmitted to the driver for driving the light-emitting module wherein the autotransformer includes a protection casing and a coil winding received in the protection casing, and the coil winding has a first positive terminal electrically connected to the first positive conductive wire, a second positive terminal electrically connected to the second positive conductive wire, and a common negative terminal concurrently and electrically mated to the first positive terminal and the second positive terminal and electrically connected to the common negative conductive wire, wherein the coil winding is divided into a primary winding disposed between the first positive terminal and the common negative terminal and a secondary winding disposed between the second positive terminal and the common negative terminal, and the circuit module is electrically connected to the second positive conductive wire and the common negative conductive wire.

14. The light-emitting device of claim 13, wherein the protection casing is composed of a base plate, two first lateral plates corresponding to each other, two second lateral plates corresponding to each other, and a cover plate, wherein the base plate, the two first lateral plates, the two second lateral plates, and the cover plate are mated to each other to form an enclosed space for receiving the coil winding.

15. The light-emitting device of claim 14, wherein the two first lateral plates are respectively extended upward from two opposite lateral sides of the base plate, each first lateral plate has two first bending portions correspondingly bent inward and two second bending portions correspondingly bent inward from two ends of the two first bending portions, each second lateral plate is disposed on the base plate and positioned between the two first bending portions of the two first lateral plates, the cover plate has two third bending portions bent downward to respectively contact the two first lateral plates and two fourth bending portions bent downward to respectively contact the two second lateral plates, and the two second bending portions of each first lateral plate pass through a notch between the third bending portion and the fourth bending portion and are retained on a top surface of the cover plate.

16. The light-emitting device of claim 14, wherein the base plate is a single substrate having at least four positioning holes, and at least four securing elements respectively pass through the at least four positioning holes to position the base plate on a heat-dissipating base.

17. The light-emitting device of claim 13, wherein the circuit module includes a light sensing switch electrically connected between the autotransformer and the driver and a dimming controller electrically connected between the light sensing switch and the driver.

* * * * *